United States Patent
Deka

(10) Patent No.: US 10,450,681 B2
(45) Date of Patent: Oct. 22, 2019

(54) HIGH STRENGTH HYDROENTANGLED SCRIM SHEET AND METHODS OF PRODUCING THE SAME

(71) Applicant: Neenah, Inc., Alpharetta, GA (US)

(72) Inventor: Ganesh Deka, Alpharetta, GA (US)

(73) Assignee: Neenah, Inc., Alpharetta, GA (US)

( * ) Notice: Subject to any disclaimer, the term of this patent is extended or adjusted under 35 U.S.C. 154(b) by 586 days.

(21) Appl. No.: 15/036,655

(22) PCT Filed: Nov. 13, 2014

(86) PCT No.: PCT/US2014/065447
§ 371 (c)(1),
(2) Date: May 13, 2016

(87) PCT Pub. No.: WO2015/073667
PCT Pub. Date: May 21, 2015

(65) Prior Publication Data
US 2016/0281281 A1    Sep. 29, 2016

Related U.S. Application Data

(60) Provisional application No. 61/903,687, filed on Nov. 13, 2013.

(51) Int. Cl.
*D04H 1/49* (2012.01)
*B24D 3/00* (2006.01)
(Continued)

(52) U.S. Cl.
CPC .............. *D04H 1/49* (2013.01); *B24D 3/004* (2013.01); *B24D 11/005* (2013.01); *B24D 11/02* (2013.01);
(Continued)

(58) Field of Classification Search
CPC ................................ B24D 11/005; D04H 3/11
See application file for complete search history.

(56) References Cited

U.S. PATENT DOCUMENTS 5,344,688 A * 9/1994 Peterson ................. B24D 3/28
427/203
6,679,758 B2 * 1/2004 Bright ..................... B24B 5/363
451/28
(Continued)

FOREIGN PATENT DOCUMENTS

EP    0656822    6/1995
EP    0710171    5/1996
(Continued)

OTHER PUBLICATIONS

International Search Report and Written Opinion issued in counterpart PCT/IS2014/065447 dated Mar. 17, 2015 (9 pages).

*Primary Examiner* — Matthew J Daniels
*Assistant Examiner* — Hana C Page
(74) *Attorney, Agent, or Firm* — Meunier Carlin & Curfman LLC

(57) ABSTRACT

Methods for forming a hydroentangled scrim sheet are provided. The method can include hydroentangling a scrim sheet having a first layer of staple fibers on a first side of the scrim sheet and a second layer of staple fibers on a second side of the scrim sheet to form a hydroentangled scrim sheet; calendaring the hydroentangled scrim sheet to form a calendared hydroentangled scrim sheet; impregnating the hydroentangled scrim sheet with a saturant composition; drying the saturant composition impregnated into the calendared hydroentangled scrim sheet; applying a bond coat onto a surface of the calendared hydroentangled scrim sheet; and applying a top coat onto the bond coat. The top coat is, in one embodiment, configured to provide a surface for further coatings thereon.

19 Claims, 1 Drawing Sheet

(51) Int. Cl.
*B24D 11/00* (2006.01)
*B24D 11/02* (2006.01)
*B32B 5/26* (2006.01)
*D04H 1/498* (2012.01)
*D04H 5/03* (2012.01)
*D04H 5/04* (2006.01)
*D04H 5/06* (2006.01)
*B32B 5/02* (2006.01)

(52) U.S. Cl.
CPC .............. *B32B 5/022* (2013.01); *B32B 5/028* (2013.01); *B32B 5/26* (2013.01); *D04H 1/498* (2013.01); *D04H 5/03* (2013.01); *D04H 5/04* (2013.01); *D04H 5/06* (2013.01); *B32B 2255/02* (2013.01); *B32B 2255/26* (2013.01); *B32B 2260/021* (2013.01); *B32B 2260/046* (2013.01); *B32B 2262/0261* (2013.01); *B32B 2262/0276* (2013.01); *B32B 2262/101* (2013.01); *B32B 2307/54* (2013.01); *B32B 2307/5825* (2013.01)

(56) References Cited

U.S. PATENT DOCUMENTS

| | | | | |
|---|---|---|---|---|
| 6,887,537 | B2* | 5/2005 | Bean | D04H 1/64 |
| | | | | 428/34.1 |
| 7,497,884 | B2* | 3/2009 | Lindquist | B24D 3/28 |
| | | | | 427/411 |
| 8,883,288 | B2* | 11/2014 | Gaeta | B24D 3/20 |
| | | | | 428/141 |
| 2004/0115431 | A1* | 6/2004 | Chen | B24D 11/005 |
| | | | | 428/373 |
| 2007/0141926 | A1* | 6/2007 | Benim | B29C 55/06 |
| | | | | 442/2 |
| 2013/0012112 | A1* | 1/2013 | Hsu | B24D 3/28 |
| | | | | 451/532 |

FOREIGN PATENT DOCUMENTS

| | | |
|---|---|---|
| EP | 0907781 | 4/1999 |
| EP | 1126066 | 8/2001 |
| EP | 1743564 | 1/2007 |
| EP | 1939342 | 7/2008 |

* cited by examiner

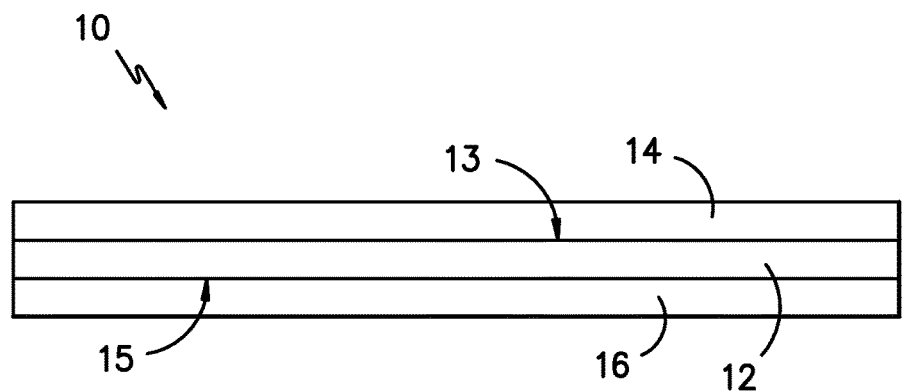
FIG. -1-
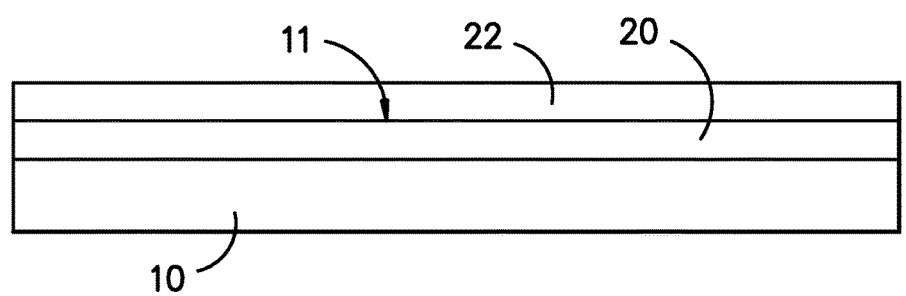
FIG. -2-

HIGH STRENGTH HYDROENTANGLED SCRIM SHEET AND METHODS OF PRODUCING THE SAME

PRIORITY INFORMATION

The present application claims priority to U.S. Provisional Patent Application Ser. No. 61/903,687 titled "High Strength Hydroentangled Scrim Sheet and Methods of Producing the Same" of Ganesh Deka filed on Nov. 13, 2013, the disclosure of which is incorporated by reference herein.

BACKGROUND

In many of the applications of abrasive backings, it is important to keep stretch properties of the substrate low so that it does not cause slippage. During development of such backings, scrims made of glass, polyester, and combination thereof were experimented with. Glass fiber scrims are characterized by high tensile strength and low stretch properties. However, rapid folding in use may cause such glass fibers to break thereby causing failure of the backing. Scrims made from polyester fibers display high strength properties, but also display higher stretch characteristics. With flexibility in use, especially in applications where sharp angles are concerned, substrates made of polyester or a combination of polyester and other materials will provide such desirable flexibility characteristics.

Cellulose based substrates do not possess such high tensile strength properties. Therefore, there is a need to develop high strength abrasive backings incorporating scrim made of polyester and other materials suitable for use as a backing for an abrasive backing materials.

SUMMARY

Objects and advantages of the invention will be set forth in part in the following description, or may be obvious from the description, or may be learned through practice of the invention.

Methods are generally provided for forming a hydroentangled scrim sheet. In one embodiment, the method includes hydroentangling a scrim sheet having a first layer of staple fibers on a first side of the scrim sheet and a second layer of staple fibers on a second side of the scrim sheet to form a hydroentangled scrim sheet; calendaring the hydroentangled scrim sheet to form a calendared hydroentangled scrim sheet; impregnating the hydroentangled scrim sheet with a saturant composition; drying the saturant composition impregnated into the calendared hydroentangled scrim sheet; applying a bond coat onto a surface of the calendared hydroentangled scrim sheet; and applying a top coat onto the bond coat. The top coat is, in one embodiment, configured to provide a surface for further coatings thereon.

In one embodiment, the hydroentangled scrim sheet can be calendared again (i.e., a second calendaring process) after drying the saturant composition impregnated into the calendared hydroentangled scrim sheet but before applying a bond coat onto a surface of the calendared hydroentangled scrim sheet.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which:

FIG. 1 shows a cross-sectional view of an exemplary hydroengtangled scrim sheet; and FIG. 2 shows a cross-sectional view of an exemplary hydroengtangled scrim sheet having a bond coating and top coating thereon.

Repeat use of reference characters in the present specification and drawings is intended to represent the same or analogous features or elements of the present invention.

DEFINITIONS

In the present disclosure, when a layer is being described as "on" or "over" another layer or substrate, it is to be understood that the layers can either be directly contacting each other or have another layer or feature between the layers, unless otherwise stated. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

The term "organic" is used herein to refer to a class of chemical compounds that are comprised of carbon atoms. For example, an "organic polymer" is a polymer that includes carbon atoms in the polymer backbone.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The glass transition temperature ($T_g$) of a polymer material may be determined by dynamic mechanical analysis (DMA) in accordance with ASTM E1640-09. A Q800 instrument from TA Instruments may be used. The experimental runs may be executed in tension/tension geometry, in a temperature sweep mode in the range from −120° C. to +150° C. with a heating rate of 3° C./min. The strain amplitude frequency may be kept constant (2 Hz) during the test. Three (3) independent samples may be tested to get an average glass transition temperature, which is defined by the peak value of the tan δ curve, wherein tan δ is defined as the ratio of the loss modulus to the storage modulus (tan δ=E"/E').

As used herein, the term "porosity" refers to Gurley porosity measuring the length of time it takes for a specified volume of air (100 $cm^3$, unless otherwise specified) to pass through a particular area (1 inch diameter circle, unless otherwise specified) of a sheet sample under a constant temperature and pressure (room atmosphere) according to the TAPPI test method T 460-02, with each sample size being 1 sq. in. in diameter (circular).

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

High strength hydroentangled scrim sheets are generally provided, along with their methods of manufacture and use. In one particular embodiment, the method includes (1) hydroentangling a scrim sheet with staple fibers from both sides of the scrim sheet to form a hydroentangled scrim sheet; (2) calendaring the hydroentangled scrim sheet to form a calendared hydroentangled scrim sheet; (3) impregnating the hydroentangled scrim sheet with a saturant composition; (4) drying the saturant composition impregnated into the calendared hydroentangled scrim sheet; (5) applying a bond coat onto a surface of the calendared hydroentangled scrim sheet; and (6) applying a top coat onto the bond coat.

It has been found that a sheet formed according to the method described above can have high tensile and tear strength while providing a smooth surface for subsequent coating(s) and/or for customer final product manufacturing. Such sheets are also found to be suitable for abrasive backings.

I. Coated Scrim Sheet

As stated above, a scrim sheet is hydroentangled with staple fibers from both sides of the scrim to form a hydroentangled scrim sheet. As shown in FIG. 1, an exemplary coated scrim sheet 10 generally includes, prior to hydroentangling, a scrim sheet 12 having a first layer of staple fibers 14 on a first side 13 of the scrim sheet 12 and a second layer of staple fibers 16 on a second side 15 of the scrim sheet 12.

A. Scrim Sheet

In certain embodiments, the scrim sheet 12 is generally formed from a web (woven or nonwoven) of polyester (e.g., polyethylene terephthalate) and/or glass fibers. Prior to hydroentanglement, the scrim sheet can, in one particular embodiment, have a basis weight of about 75 gsm to about 125 gsm. The thickness may, in particular embodiments, vary from about 9.0 mm to 11.0 mm.

The scrim sheets may or may not be resin bonded. For example, in one embodiment, a resin bonded scrim sheet can be utilized that has resin bonding to provide restriction to stretching and thereby final stretch properties of the substrate. The spacing of the yarns together with denier may also provide desired strength properties as well as processing of the web in making the final product.

The scrim sheet 12 is generally porous, and serves as an open sheet, such that the Gurley porosity value is nearly 0 sec/100 cc (i.e., an immeasurable amount of resistance in the Gurley porosimeter). Other conventional measuring devices, such as a Frazier Differential Pressure Air Permeability measuring instrument, can also be used for non-polymer impregnated sheet measurement, but such equipment is not generally desirable for coated sheets.

The scrim sheets may be a laid scrim or a woven scrim.

B. First and Second Coatings

The first and second layers of staple fibers 14, 16 are on opposite sides 13, 15 of the scrim sheet 12 to form the hydroentangled scrim sheet. The first layer of staple fibers 14 and the second layer of staple fibers 16 can be formed using similar fibers or different fiber compositions, as desired.

In one embodiment, the first and second layers of staple fibers 14, 16 can comprise, independently, polyester fibers (e.g., polyethylene terephthalate) having a denier per filament range of about 1.0 to about 1.5, such as a denier per filament range of about 1.1 to about 1.3. In one particular embodiment, the first and second layers of staple fibers 14, 16 can include bicomponent polyester fibers, such as bicomponent polyester fibers having a core component surrounded by a sheath component. In such an embodiment, the sheath component can include a polyester having a melt temperature that is about 110° C. to about 115° C., and/or the core component can include a polyester having a melt temperature that is greater than the melt temperature of the sheath component. As such, the sheath component may melt during drying or calendaring of the hydroentangled scrim sheet, while the core component remains a solid. Thus, melt bonds can be formed between the hydroentangled fibers and the fibers of the scrim sheet while keeping the integrity of the fibers intact.

Selection in making layers of staple fibers depends on functionality of each surface also. Whereas surface to be polymer coated needs to be tighter (less porous or more fibers per surface area), fiber selection will be more towards smaller denier and thereby results more number of fibers. Such criteria can be used in forming the two layers of hydroentangled scrim.

It is noted that depending on machine capability, layers 14 and 16 may be formed with single or a number of layers forming into these two layers.

Generally, each of the layers 14, 16 can be formed on the relative surfaces 13, 15 of the scrim sheet 12 at a basis weight of about 45 gsm to about 75 gsm (e.g., about 50 gsm to about 65 gsm). For example, the second layer 16 can be formed, the scrim sheet 12 placed thereon, and the first layer 14 formed on the scrim sheet (e.g., on a manufacturing belt/process for hydroentangling and further processing).

II. Hydroentangling

The scrim sheet 12 with the first and second layers of staple fibers 14, 16 are on opposite sides 13, 15 of the scrim sheet 12 is subjected to a hydroentangling process, as known in the art, to intermix the fibers of the first and second layers of staple fibers 14, 16 into the scrim sheet 12 to form the hydroentangled scrim sheet 10. Hydroentangled nonwoven fabrics are disclosed, for example, in U.S. Pat. No. 3,494,821 to Evans and U.S. Pat. No. 4,144,370 to Bouolton, which are both incorporated herein by reference. Hydroentangled composite nonwoven fabrics are also disclosed in U.S. Pat. No. 5,284,703 to Everhart, which is also incorporated herein by reference.

After hydroentangling, the thickness of the hydroentangled scrim sheet 10 can be about 75% to about 95% of the original thickness of the scrim sheet 12 without the staple fiber layers thereon. That is, the thickness is slightly decreased during the hydroentangling process, likely due to the pressure exerted by the water jets onto the scrim sheet.

However, the porosity of the hydroentangled scrim sheet 10 remains substantially open even after hydroentangling. That is, the hydroentangled scrim sheet 10 is generally porous, and serves as an open sheet, such that the Gurley porosity is 0 sec/100 cc (i.e., an immeasurable amount of resistance in the Gurley porosimeter).

III. Calendaring

After hydroentangling, the hydroentangled scrim sheet is calendared to form a calendared hydroentangled scrim sheet. In one particular embodiment, the hydroentangled sheet is calendared prior to impregnating the calendared hydroentangled scrim sheet with a saturant composition.

Calendaring the hydroentangled sheet can be achieved by passing the hydroentangled sheet between two rollers, with at least one of the rollers has a calendaring temperature of about 250° F. to about 350° F. In one embodiment, both rollers can have a calendaring temperature of about 250° F. to about 350° F. The rollers can be, in certain embodiments, pressed together to form a nip configured to exert a calendaring pressure of about 1500 PSI to about 2500 PSI onto the hydroentangled sheet.

Without wishing to be bound by any particular theory, it is believed that calendaring consolidates the substrates to provide a better caliper profile as well as a smoother sheet. It also makes the sheet less porous, and/or reduces the size of the pores, and/or reduces the void volume of the sheet. For a fully synthetic fiber sheet, it also provides a better polymer distribution. It is also found that it is easier to consolidate the substrate at this stage in its construction rather than after polymer impregnation and coating.

After calendaring, the thickness of the hydroentangled scrim sheet 10 can be about 50% to about 75% (e.g., about 60% to about 70%) of the original thickness of the scrim sheet 12 without the staple fiber layers thereon. That is, the thickness is decreased during the calendaring process.

However, even following calendaring, the porosity of the hydroentangled scrim sheet 10 remains substantially open even after hydroentangling. That is, the hydroentangled scrim sheet 10 is generally porous, and serves as an open sheet, such that the Gurley porosity is 0 sec/100 cc (i.e., an immeasurable amount of resistance in the Gurley porosimeter).

IV. Saturant Composition

In accordance with the present invention, the calendared hydroentangled scrim sheet is saturated with a saturant composition. The saturant composition can further improve the strength properties and reduce the stretch properties of the resulting scrim sheet. Because of use of water jet for hydroentanglement of the staple fibers, the resulting hydroentangled scrim sheet is very open (i.e., porous). Even with thick layers of staple fibers on both sides of the scrim sheet, the resulting hydroentangled scrim sheet remains open. With hydrophobic characteristics of scrims made of polyester or glass fibers, this porous structure remains immune to aqueous polymer saturation of the web. Therefore, the parameters helping in polymer impregnation by the saturant include the network formed by the fibers (i.e., the fibers of the scrim sheet and the hydroentangled staple fibers) and the closeness of such fibers. In this respect, calendaring helps as this process densifies the structure, and therefore allowing a saturant or coating to form a coherent structure or film formation.

The saturant composition, as well as the binder selection in the bond coat discussed below, is primarily selected based on how the porous hydro-entangled scrim sheet can be filled in to partly reduce porosity, as well as how well the bond coat will adhere to the structure and provide even further reduction in porosity so that a top coat can be applied onto the structure.

In one embodiment, the saturant composition includes a styrene butadiene latex polymer. As used herein, the term "latex polymer" refers to an emulsion of the polymer in a solvent (typically water). Particularly suitable styrene butadiene latex polymers are those having a relatively low $T_g$, such as about −15° C. to about −40° C. A glass transition temperature ($T_g$) is useful in characterizing many important physical attributes of thermoplastic, thermosets, and semi-crystalline materials including their thermal history, processing conditions, physical stability, progress of chemical reactions, degree of cure, and both mechanical and electrical behavior.

In one particular embodiment, the styrene-butadiene latex including carboxyl groups can be included in the saturant composition, such as the carboxylated styrene-butadiene latex sold as DL 220NA by Styron (Berwyn, Pa.) which has a $T_g$ of about −30° C. Without wishing to be bound by theory, carboxylation of the latex polymer is believed to provide polar functional groups along the polymer chain. These polar functional groups can increase the ability of the latex polymer to interact chemically (e.g., crosslinking, hydrogen bonding, van der Waals forces, etc.) with other molecules in the saturation composition, staple fibers, and/or scrim fibers, which can result in a strengthened, bonded polymer matrix formed.

The latex polymer can be provided in an emulsion, typically an aqueous emulsion. The solids content of the latex polymer emulsion can be from about 1% by weight to about 65% by weight, such as from about 10% to about 60%. In one particular embodiment, the solids content of the latex polymer emulsion is from about 40% to about 55% by weight.

In most embodiments, the latex polymer is not substantially crosslinked upon drying (e.g., less than about 10% crosslinking). However, in certain embodiments, the latex polymer may be crosslinked, if desired. For example, the latex polymer may be self-crosslinking, with the aid of a crosslinking agent. Alternatively, the latex polymer can be crosslinked to a crosslinking agent, such as a resin (e.g., an epoxy resin).

Any known saturation technique may be employed, such as brushing, flooded nip saturation, doctor blading, spraying, and direct and offset gravure coating. For example, the web may be exposed to an excess of the solution and then squeezed. The squeezing of excess binder from the web may be accomplished by passing the web between rollers. If desired, the excess binder may be returned to the supply for further use. After squeezing out excess material, the saturated web may then be dried. Other suitable techniques for impregnating a web with a saturant composition are described in U.S. Pat. No. 5,595,828 to Weber and U.S. Patent Application Publication No. 2002/0168508 to Reed, et al., which are incorporated herein in their entirety by reference thereto for all purposes. The amount of the saturant composition applied may vary depending on the desired properties of the web, such as the desired permeability. Typically, the saturant composition is present at an add-on level of from about 15% to about 100%, in some embodiments from about 40% to about 90%, and in some embodiments, from about 50% to about 85%. The add-on level is calculated, on a dry weight basis, by dividing the dry weight of saturant composition applied by the dry weight of the web before treatment, and multiplying the result by 100.

In addition to the ingredients set forth above, various other additives may also be employed in the fibrous web. The additives may be applied directly the web or fibers, in conjunction with the saturant composition or adhesive coating, or as a separate coating. By way of example, suitable additives may include antifoaming agents, pigments, processing aids, and dispersing agents. Examples of antifoaming agents include, but are not limited to, products such as NALCO® 7518 available from Nalco Chemical Company or DOW Corning® Antifoam available from Dow Corning Corporation. Dispersing agents or surfactants include, but are not limited to, products such as TAMOL® 731A available from Rohm & Haas Co., PLURONICO F108 available from BASF Corporation, SMA® 1440 Resin available from ATOFINA Chemicals, Inc., and TERGITOL® 15S available from Union Carbide Corp. Examples of processing aids may include, but are not limited to, products such as NOPCOTE® DC-100A available from Geo Specialty Chemicals, Inc., SCRIPSET® 540 available from Solutia, Inc. and AQUAPEL® 752 available from Ashland, Inc. (Covington, Ky.). Examples of pigments used to increase opacity include but are not limited to, titanium dioxide such as TI-PURE® Rutile Titanium Dioxide available from E.I. Du Pont De Nemours & Co. and kaolin pigments, which are available from a variety of manufacturers. A wide range of pigments and dyes may also be added to impart color to the saturated sheet. The foregoing list of categories of additives and examples of categories is provided by way of example and is not intended to be exhaustive.

V. Drying

After saturation, the saturant composition impregnated into the calendared hydroentangled scrim sheet is dried. For example, drying can be accomplished by heating the saturant composition impregnated into the calendared hydroentangled scrim sheet to a temperature of about 75° C. to about 105° C. (e.g., 75° C. to about 95° C.) for about sufficient period (e.g., about 30 seconds to about 5 minutes, such as about 1 minute to about 2 minutes). Other drying methods can also be used, depending on the saturant composition (e.g., UV, electron beam, etc.).

Following drying of the saturation composition, the dried, saturated calendared hydroentangled scrim sheet can have a Gurley porosity of about 0.25 sec/100 cc to about 10 sec/100 cc, such as about 0.25 sec/100 cc to about 1 sec/100 cc. That is, the saturated, calendared hydroentangled scrim sheet is less porous after saturation, but is still relatively porous.

In one embodiment, the thickness of the dried, saturated calendared hydroentangled scrim sheet can be less than the thickness of the calendared hydroentangled scrim sheet prior to saturation. For example, the thickness of the dried, saturated calendared hydroentangled scrim sheet can be about 65% to about 85% of the thickness of the calendared hydroentangled scrim sheet prior to saturation. Without wishing to be bound by any particular theory, it is believed that the saturant composition bonds with the fibers (scrim fibers and/or staple fibers) of the hydroentangled sheet to close the fiber network, thereby reducing the thickness of the sheet.

VI. Optional Second Calendaring

Due to the open nature of the scrim sheet 12, especially woven scrim sheets, the saturated, calendared, hydroentangled scrim sheet still has undulations in its surface. That is, the areas corresponding to where fibers form the scrim sheet 12 are thicker than the areas corresponding to open areas/voids defined by the scrim sheet 12. These undulations remain present even after hydroentangling, calendaring, and saturating the scrim sheet, and lead to a relatively rough or uneven surface in the final coated product. In certain embodiments, the undulations and relatively uneven surface are useful and desired, such as for wet sanding applications. In these embodiments, no further calendaring step is performed.

However, in other embodiments, a relatively smooth surface is desired for the final coated product. In such embodiments, the hydroentangled scrim sheet 10 is calendared for a second time (i.e., following the first calendaring, saturating, and drying). The second calendaring process can be described as set forth above with respect to the first calendaring process. That is, the second calendaring of the hydroentangled sheet can be achieved by passing the hydroentangled sheet between two rollers, with at least one of the rollers has a calendaring temperature of about 250° F. to about 350° F. In one embodiment, both rollers can have a calendaring temperature of about 250° F. to about 350° F. The rollers can be, in certain embodiments, pressed together to form a nip configured to exert a calendaring pressure of about 1500 PSI to about 2500 PSI onto the hydroentangled sheet.

Without wishing to be bound by any particular theory, it is believed that the second calendaring consolidates the saturated substrate to distribute the saturant within the scrim sheet to result in a smoother sheet, effectively filling the open areas/voids of the scrim with the saturant. It also makes the sheet less porous, and/or reduces the size of the pores, and/or reduces the void volume of the sheet. For a fully saturated fiber sheet, it also provides a better saturant distribution. Thus, this second calendaring process can provide smoother surface properties to the saturated hydroentangled scrim sheet.

VII. Bond Coat

As shown in FIG. 2, a bond coat 20 is applied onto at least one surface 11 of the hydroentangled scrim sheet 10 following calendaring, saturating, and drying. The bond coat 20 generally forms a substantially uniform surface on the hydroentangled scrim sheet 10 for subsequent application of additional layers.

For example, the bond coat can include a film-forming material, such as polyacryls, polymethacryls, polyurethane-polyacryl mixtures, polyurethane-polymethacryl mixtures, urethane-acryl copolymers, or mixtures thereof. In one particular embodiment, the film-forming material can include polyurethanes, such as aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. Preferred polyurethanes can be selected from aromatic polyether polyurethanes, aliphatic polyether polyurethanes, aromatic polyester polyurethanes, and aliphatic polyester polyurethanes. Examples of preferred polyurethanes can include Sancure® 2710 and/or Avelure® UR 445 (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer") both of which are commercially available from Lubrizol, Cleveland, Ohio. In one particular embodiment, the film-forming material can be an aliphatic polyether polyurethane available under the name Sancure® 2710 (Lubrizol, Cleveland, Ohio). In one embodiment, a wetting agent (e.g., Triton X-100) can be added in order to improve wettability.

The bond coat has a basis weight, in a particular embodiment, of about 11 gsm to about 14 gsm. The thickness of the bond coat can be applied such that the overall thickness of the resulting coated hydroentangled scrim sheet increases slightly, such as increases by about 10% to about 25%. Due to the slightly porous surface of the saturated, calendared, hydroentangled scrim sheet, some of the bond coat will serve to fill any remaining pores in the scrim sheet. As such, following drying of the bond coat, the resulting coated scrim sheet can have a Gurley porosity that is greater than about 1,000 sec/100 cc, such as about 2000 sec/100 cc to about 5000 sec/100 cc. That is, the coated hydroentangled scrim sheet is relatively impermeable to air after saturation and drying.

VIII. Top Coat

As shown in FIG. 2, a top coat 22 is applied on the bond coat 20 opposite of the hydroentangled scrim sheet 10. The top coat 20 generally forms a substantially uniform surface on the hydroentangled scrim sheet 10 for subsequent application of additional layers.

The top coat 22 includes, one particular embodiment, a styrene butadiene polymer, such as DL 240 from Styron, Midland, Mich. and an acrylic polymer, such as HYCAR® 26760; an acrylic latex available from Lubrizol, Cleveland, Ohio.

Additionally, the top coat 22 may include other additives. For example, inorganic fillers, such as talc, calcium carbonate, clay, silica, etc., may be present in the top coat 22 to give a matte-look to the final product. Examples of such inorganic fillers may include NYTAL 7700 talc pigment (The Cary Company, Addison, Ill.), VANTALC PC and 4000 talc powders (R.T. Vanderbilt Company, Inc., Norwalk, Conn.). The particle size for the filler may be in the range of about 0.5 μm to 30 μm, particularly about 1 μm to 20 μm, more particularly about 2 μm to 10 μm.

As such, following drying of the top coat, the resulting coated scrim sheet can have a Gurley porosity that is greater than about 1,000 sec/100 cc, such as about 2000 sec/100 cc to about 5000 sec/100 cc. That is, the coated hydroentangled scrim sheet is relatively impermeable to air after saturation and drying.

The thickness of the top coat can be applied such that the overall thickness of the resulting coated hydroentangled scrim sheet increases only slightly, such as increases by about 10% or less.

Example 1

Table 1 below shows the thickness and Gurley porosity value after different stages of the manufacturing process of the exemplary sample sheets described below:

TABLE 1

Thickness & Porosity Measurements on Various Samples

| | Conditions | Thickness, mm | Gurley Porosity, sec/100 cc |
|---|---|---|---|
| A | Uncalendared, hydroentangled scrim sheet | 0.84 | Open Sheet (i.e., ~0) |
| B | Calendared, hydroentangled scrim sheet | 0.56 | Open Sheet (i.e., ~0) |
| C | Saturated, calendared hydroentangled scrim sheet | 0.41 | 0.5 |
| D | Saturated + Bond Coated | 0.47 | >3,000 |
| E | Saturated + Bond Coated + Top Coated | 0.48 | >3,000 |

A coated substrate was made in the laboratory from a hydroentangled sheet as follows:

1. A hydroentangled scrim sheet with 115 gsm polyethylene terephthalate (PET) scrim and 57.5 gsm 1.2 dpf, 1.5" PET staple fibers on each side of scrim was used for this experimentation. The basis weight of this substrate was 230 gsm. This sample is labeled A in Table 1 above.

2. The hydroentangled sheet was calendared in a 2 roller soft nip calendar with top steel heated to 285° F. and the bottom roll not heated. The calendaring pressure on the nip was 2000 PSI. The heated side (top side) was used for coating. The calendared hydroentangled scrim is labeled as B in Table 1.

3. Using the saturant composition shown in Table 2, the calendared hydroentangled scrim was polymer impregnated. Drying was done at 300° F. The dried sample is labeled C in Table 1.

TABLE 2

FORMULATION FOR SATURATION

| INGREDIENTS | % | PARTS | DRY | WET |
|---|---|---|---|---|
| DL 220 NA | 45 | 100 | 800 | 1778 |
| BOSTEX 24 | 50 | 0.21 | 1.7 | 3.4 |
| AMMONIA (NH$_3$) | 19 | 0.83 | 6.6 | 35 |
| WATER | | | | 584 |
| ULTRA WHITE 90 SLURRY | 69 | 30 | 240 | 348 |
| SCRIPSET 540 SLN. (SS-58) | 10 | 2.5 | 20 | 200 |
| SUNSIZE 137 | 40 | 0.85 | 6.4 | 16 |
| TOTALS | 36.3 | | 1074.8 | 2964 |

DL 220 NA is a carboxylated styrene-butadiene latex sold by Styron (Berwyn, Pa.). Bostex 24 is a 50% active aqueous dispersion of Hindered Phenol-Type antioxidants available from Akron Dispersion (Akron, Ohio). ULTRAWHITE 90® is a clay slurry (Engelhard Corporation, Iselin, N.J.). SCRIPSET 540 SLN. (SS-58) is a high molecular weight, styrene/maleic anhydride copolymer, esterified with a low molecular weight butyl methyl ester available from Ashland, Inc. (Covington, Ky.). Sunsize 137 is a water repellant (available from Sun Chemical).

4. The polymer impregnated hydroentangled scrim is coated with the bond coat formulation as shown in Table 3. The coating was applied with #8 Meyer rod with a target 3.0 lbs. per 1300 square feet coat weight. Coating was dried at 300° F. The resulting sample is labeled D in Table 1.

TABLE 3

FORMULATION FOR BOND COAT

| INGREDIENTS | % | DRY PARTS | WET | BATCH |
|---|---|---|---|---|
| WATER | | | 27.0 | 19.4 |
| SANCURE 2710 | 40 | 100 | 250.0 | 179.5 |
| TRITON x-100 | 33 | 0.5 | 1.5 | 1.1 |
| TOTAL | 36.08 | 100.5 | 278.5 | 200.0 |

SANCURE® 2710 is an aliphatic polyether polyurethane available under the name Sancure® 2710 (Lubrizol, Cleveland, Ohio). Triton® X-100 (Dow Chemical Company) is a nonionic surfactant serving as a wetting agent in the bond coat, and has a hydrophilic polyethylene oxide chain (on average it has 9.5 ethylene oxide units) and an aromatic hydrocarbon lipophilic or hydrophobic group.

5. The bond coated, polymer impregnated hydroentangled scrim was coated with the top coat formulation, as shown in Table 4. The coating was applied with #10 Meyer rod with a target 2.5 lbs. per 1300 square feet coat weight. Coating was dried at 300° F. The resulting sample is labeled E in Table 1.

TABLE 4

FORMULATION FOR TOP COAT

| INGREDIENTS | % | DRY PARTS | WET | BATCH |
|---|---|---|---|---|
| WATER | | | 36 | 179.6 |
| DL 240 | 48.1 | 200 | 415.8 | 2074.8 |
| HYCAR 26706 | 49.5 | 130 | 262.6 | 1310.5 |
| ULTRAWHITE 90 | 69.0 | 60 | 87.0 | 433.9 |
| TOTAL | 48.7 | 390 | 765.4 | 3998.8 |

Example 2

A coated substrate was made in the laboratory from a hydroentangled sheet as follows:

1. A hydroentangled scrim sheet with 115 gsm polyethylene terephthalate (PET) scrim and 57.5 gsm 1.2 dpf, 1.5" PET staple fibers on each side of scrim was used for this experimentation. The basis weight of this substrate was 230 gsm. This sample is labeled A in Table 1 above.

2. The hydroentangled sheet was calendared in a 2 roller soft nip calendar with top steel heated to 285° F. and the bottom roll not heated. The calendaring pressure on the nip was 2000 PSI. The heated side (top side) was used for coating. The calendared hydroentangled scrim is labeled as B in Table 1.

3. Using the saturant composition shown in Table 5, the calendared hydroentangled scrim was polymer impregnated. Drying was done at 300° F.

TABLE 5

FORMULATION FOR SATURATION

| INGREDIENTS | % | PARTS | DRY | WET |
|---|---|---|---|---|
| DL 220 NA | 45 | 100 | 800 | 1778 |
| BOSTEX 24 | 50 | 0.21 | 1.7 | 3.4 |
| AMMONIA (NH$_3$) | 19 | 0.83 | 6.6 | 35 |
| WATER | | | | 2000 |
| ULTRA WHITE 90 SLURRY | 69 | 149 | 1120 | 1727.5 |
| SCRIPSET 540 SLN. (SS-58) | 10 | 2.5 | 20 | 200 |
| SUNSIZE 137 | 40 | 0.85 | 6.8 | 17 |
| TOTALS | 34.6 | 244.4 | 1955.1 | 5760.9 |

4. After drying of the saturant composition, the saturated, hydroentangled sheet was again calendared in a 2 roller soft nip calendar with top steel heated to 285° F. and the bottom roll not heated. The calendaring pressure on the nip was 2000 PSI. The heated side (top side) was used for coating.

5. The polymer impregnated hydroentangled scrim is coated with the bond coat formulation as shown in Table 6. The coating was applied with #8 Meyer rod with a target 3.0 lbs. per 1300 square feet coat weight. Coating was dried at 300° F.

TABLE 6

FORMULATION FOR BOND COAT

| INGREDIENTS | % | DRY PARTS | WET |
|---|---|---|---|
| WATER | | | 36.0 |
| DL 240 | 48.1 | 200 | 415.8 |
| Hycar 26706 | 49.5 | 130 | 262.6 |
| TOTAL | 46.2 | 330.0 | 714.4 |

6. The bond coated, polymer impregnated hydroentangled scrim was coated with the top coat formulation, as shown in Table 7. The coating was applied with #10 Meyer rod with a target 2.5 lbs. per 1300 square feet coat weight. Coating was dried at 300° F.

TABLE 7

FORMULATION FOR TOP COAT

| INGREDIENTS | % | DRY PARTS | WET |
|---|---|---|---|
| WATER | | | 36 |
| DL 240 | 48.1 | 200 | 415.8 |
| HYCAR 26706 | 49.5 | 130 | 262.6 |
| TOTAL | 46.2 | 330 | 714.4 |

Example 3

A coated substrate was made in the laboratory from a hydroentangled sheet as follows:

1. A hydroentangled scrim sheet with 115 gsm polyethylene terephthalate (PET) scrim and 57.5 gsm 1.2 dpf, 1.5" PET staple fibers on each side of scrim was used for this experimentation. The basis weight of this substrate was 230 gsm. This sample is labeled A in Table 1 above.

2. The hydroentangled sheet was calendared in a 2 roller soft nip calendar with top steel heated to 285° F. and the bottom roll not heated. The calendaring pressure on the nip was 2000 PSI. The heated side (top side) was used for coating. The calendared hydroentangled scrim is labeled as B in Table 1.

3. Using the saturant composition shown in Table 8, the calendared hydroentangled scrim was polymer impregnated. Drying was done at 300° F.

TABLE 8

FORMULATION FOR SATURATION

| INGREDIENTS | % | PARTS | DRY | WET |
|---|---|---|---|---|
| DL 220 NA | 45 | 100 | 800 | 1778 |
| BOSTEX 24 | 50 | 0.21 | 1.7 | 3.4 |
| AMMONIA (NH$_3$) | 19 | 0.83 | 6.6 | 35 |
| WATER | | | | 2000 |
| ULTRA WHITE 90 SLURRY | 69 | 149 | 1120 | 1623.2 |
| SCRIPSET 540 SLN. (SS-58) | 10 | 2.5 | 20 | 200 |
| SUNSIZE 137 | 40 | 0.85 | 6.8 | 17 |
| TOTALS | 34.6 | 244.4 | 1955.1 | 5656.2 |

4. After drying of the saturant composition, the saturated, hydroentangled sheet was again calendared in a 2 roller soft nip calendar with top steel heated to 285° F. and the bottom roll not heated. The calendaring pressure on the nip was 2000 PSI. The heated side (top side) was used for coating.

5. The polymer impregnated hydroentangled scrim is coated with the bond coat formulation as shown in Table 9. The coating was applied with #8 Meyer rod with a target 3.0 lbs. per 1300 square feet coat weight. Coating was dried at 300° F.

TABLE 9

FORMULATION FOR BOND COAT

| INGREDIENTS | % | DRY PARTS | WET |
|---|---|---|---|
| WATER | | | 36.0 |
| DL 240 | 48.1 | 200 | 415.8 |

TABLE 9-continued

FORMULATION FOR BOND COAT

| INGREDIENTS | % | DRY PARTS | WET |
|---|---|---|---|
| Hycar 26706 | 49.5 | 130 | 262.6 |
| Ultra White 90 Slurry | 69.0 | 60 | 87.0 |
| TOTAL | 48.7 | 390 | 801.4 |

6. The bond coated, polymer impregnated hydroentangled scrim was coated with the top coat formulation, as shown in Table 10. The coating was applied with #10 Meyer rod with a target 2.5 lbs. per 1300 square feet coat weight. Coating was dried at 300° F.

TABLE 10

FORMULATION FOR TOP COAT

| INGREDIENTS | % | DRY PARTS | WET |
|---|---|---|---|
| WATER | | | 36 |
| DL 240 | 48.1 | 200 | 415.8 |
| HYCAR 26706 | 49.5 | 130 | 262.6 |
| Ultra White 90 Slurry | 69.0 | 60 | 87.0 |
| TOTAL | 48.7 | 390 | 801.4 |

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of forming a hydroentangled scrim sheet, the method comprising:
hydroentangling a scrim sheet having a first layer of staple fibers on a first side of the scrim sheet and a second layer of staple fibers on a second side of the scrim sheet to form a hydroentangled scrim sheet, wherein the scrim sheet consists essentially of polyester fibers, glass, or a combination thereof;
calendaring the hydroentangled scrim sheet to form a calendared hydroentangled scrim sheet;
impregnating the hydroentangled scrim sheet with a saturant composition;
drying the saturant composition impregnated into the calendared hydroentangled scrim sheet;
applying a bond coat onto a surface of the calendared hydroentangled scrim sheet; and
applying a top coat onto the bond coat, wherein the top coat is configured to provide a surface for further coatings thereon.

2. The method of claim 1, wherein the top coat comprises a styrene butadiene latex, an acrylic latex, and a clay, and wherein the bond coat comprises a polyurethane dispersion, and a wetting agent and/or a viscosity modifier and/or a rheology modifier.

3. The method of claim 1, wherein the scrim sheet, prior to coating or entanglement, has a basis weight of about 75 gsm to about 125 gsm.

4. The method of claim 1, further comprising:
after drying the saturant composition impregnated into the calendared hydroentangled scrim sheet but before applying a bond coat onto a surface of the calendared hydroentangled scrim sheet, again calendaring the hydroentangled scrim sheet.

5. The method of claim 1, wherein the first layer on the first side of the scrim sheet comprises polyester fibers having a denier per filament range of about 1.0 to about 1.5.

6. The method of claim 1, wherein the first layer on the first side of the scrim sheet comprises is applied at a thickness of about 40 gsm to about 100 gsm.

7. The method of claim 1, wherein the first layer on the first side of the scrim sheet comprises a fibrous web that includes bicomponent polyester fibers, and wherein the bicomponent polyester fibers have a core component surrounded by a sheath component.

8. The method of claim 7, wherein the sheath component includes a polyester having a melt temperature that is about 110° C. to about 115° C.

9. The method of claim 8, wherein the core component includes a polyester having a melt temperature that is greater than the melt temperature of the sheath component.

10. The method of claim 9, wherein the sheath component melts during drying or calendaring of the hydroentangled scrim sheet.

11. The method of claim 1, wherein the first layer of staple fibers on the first side of the scrim sheet comprises fibers that having an average denier that is finer than fibers of the second layer of staple fibers on the second side of the scrim sheet.

12. The method of claim 1, wherein the saturant composition comprises a styrene-butadiene polymer, or wherein the saturant composition comprises a carboxylated styrene-butadiene polymer.

13. The method of claim 1, wherein the scrim sheet has a Gurley porosity that is about 0 sec/100 cc after hydroentangling, and wherein the scrim sheet has a Gurley porosity that is about 0 sec/100 cc after calendaring, and wherein the scrim sheet has a Gurley porosity that is 0.25 sec/100 cc to about 10 sec/100 cc after saturating and drying, and further wherein the scrim sheet has a Gurley porosity that is greater than about 1,000 sec/100 cc after applying the bond coat.

14. The method of claim 1, wherein drying the saturant composition impregnated into the calendared hydroentangled scrim sheet comprises heating the saturant composition impregnated into the calendared hydroentangled scrim sheet to a temperature of about 75° C. to about 105° C.

15. The method of claim 1, wherein the hydroentangled sheet is calendared prior to impregnating the calendared hydroentangled scrim sheet with a saturant composition.

16. The method of claim 1, wherein the hydroentangled sheet is calendared by passing the hydroentangled sheet between two rollers, wherein at least one of the rollers has a calendaring temperature of about 250° F. to about 350° F.

17. The method of claim 15, wherein the rollers are pressed together to form a nip configured to exert a calendaring pressure of about 1500 PSI to about 2500 PSI onto the hydroentangled sheet.

18. The method of claim 1, wherein the first layer on the first side of the scrim sheet comprises polyester fibers having a denier per filament range of about 1.1 to about 1.3.

19. A method of forming a hydroentangled scrim sheet, the method comprising:
hydroentangling a scrim sheet having a first layer of staple fibers on a first side of the scrim sheet and a second layer of staple fibers on a second side of the scrim sheet to form a hydroentangled scrim sheet;

calendaring the hydroentangled scrim sheet to form a calendared hydroentangled scrim sheet;
impregnating the hydroentangled scrim sheet with a saturant composition;
drying the saturant composition impregnated into the calendared hydroentangled scrim sheet;
applying a bond coat onto a surface of the calendared hydroentangled scrim sheet; and
applying a top coat onto the bond coat, wherein the top coat is configured to provide a surface for further coatings thereon, and
wherein the top coat comprises a styrene butadiene latex, an acrylic latex, and a clay, and wherein the bond coat comprises a polyurethane dispersion, and a wetting agent and/or a viscosity modifier and/or a rheology modifier.

* * * * *